United States Patent [19]

Kukla

[11] 4,271,099
[45] Jun. 2, 1981

[54] APPARATUS FOR THOROUGH MIXTURE OF A LIQUID WITH A GAS

[76] Inventor: Thomas S. Kukla, 2616 N. Merrimac, Chicago, Ill. 60639

[21] Appl. No.: 80,387

[22] Filed: Oct. 1, 1979

[51] Int. Cl.³ .............................................. B01F 3/04
[52] U.S. Cl. ........................................ 261/76; 43/57; 138/40; 210/169; 210/220; 261/121 M; 261/DIG. 75
[58] Field of Search ............ 261/76, 121 M, DIG. 75; 138/40; 210/169, 220; 4/180; 128/66; 43/56, 57

[56] References Cited

U.S. PATENT DOCUMENTS

| | | | |
|---|---|---|---|
| 1,176,870 | 3/1916 | Stenhouse | 261/76 |
| 1,526,179 | 2/1925 | Parr et al. | 261/DIG. 75 |
| 1,808,956 | 6/1931 | Ketterer | 261/DIG. 75 |
| 2,388,753 | 11/1945 | Mallmann et al. | 261/DIG. 75 |
| 2,929,889 | 3/1960 | Efther | 138/40 X |
| 3,113,593 | 12/1963 | Vicard | 138/40 X |
| 3,146,195 | 8/1964 | Berardi | 210/169 |
| 3,587,976 | 6/1971 | Jacuzzi | 261/DIG. 75 |
| 3,756,220 | 9/1973 | Tehrani et al. | 210/169 X |

Primary Examiner—Richard L. Chiesa
Attorney, Agent, or Firm—Lee, Smith & Jager

[57] ABSTRACT

An apparatus with a unique venturi construction and restriction structure, a liquid intake conduit and mixing chamber is provided for mixing virtually any liquid with any gas, and is particularly designed for efficient aeration of water, such as for use with aquariums and home aquaculture systems. The relative placement of different portions of the apparatus and relative sizes of the component parts are found to be a factor in improving efficiency. One embodiment, combining the unique restriction structure with a rough-edged ring inside the apparatus, is designed for excellent operation efficiency at liquid circulation pressures previously thought to be too low for incorporation of an aerating or intermixing device. The need for an additional intermixing pump is thereby eliminated and a high percentage of gas is dissolved in the liquid, compared to other similar use devices. A second embodiment is designed more specifically for use at higher liquid pressures such as for purification of standing bodies of water, for sewage treatment and for commercial "fish farms", providing excellent intermixing at these higher pressures.

18 Claims, 11 Drawing Figures

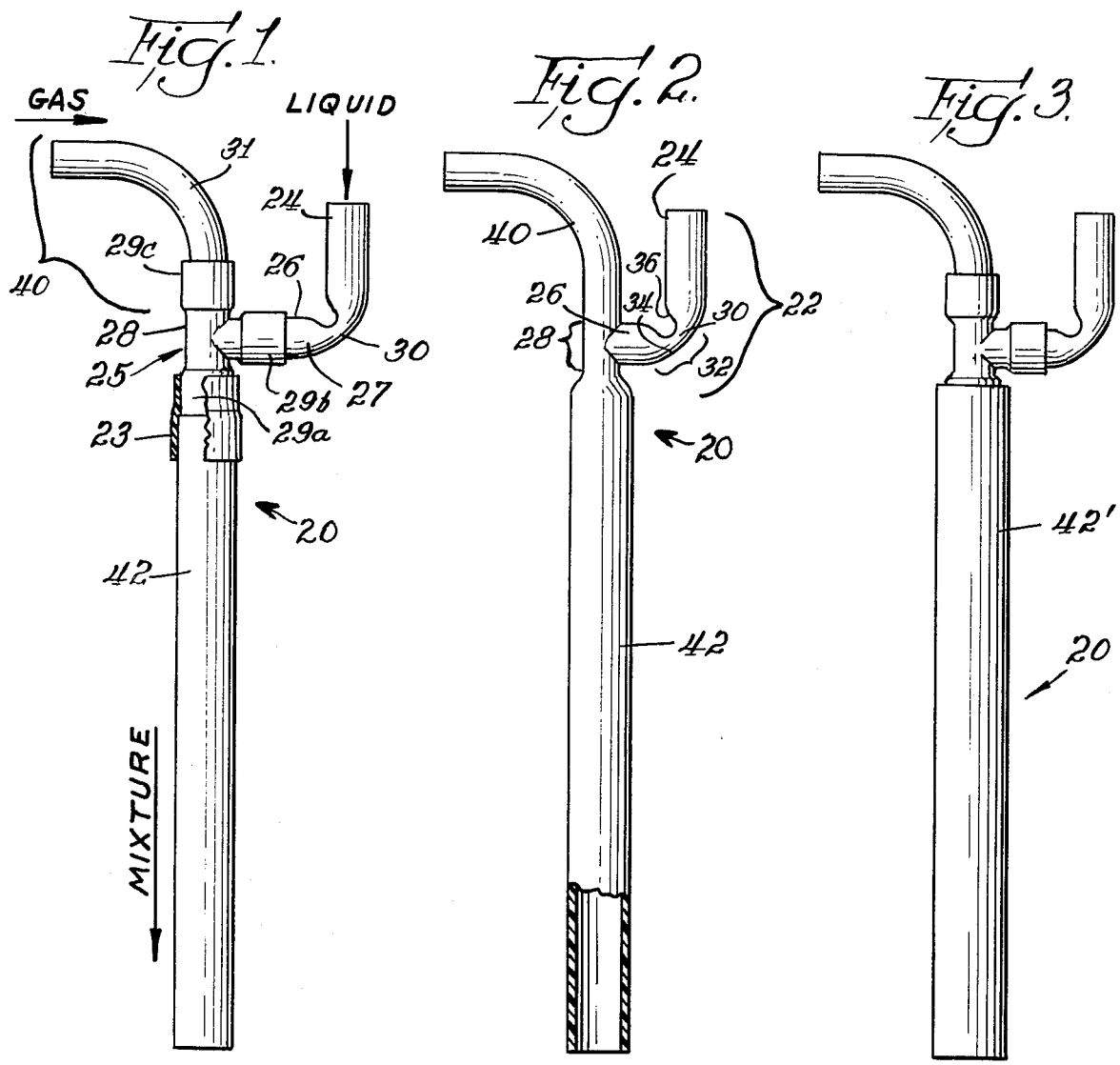
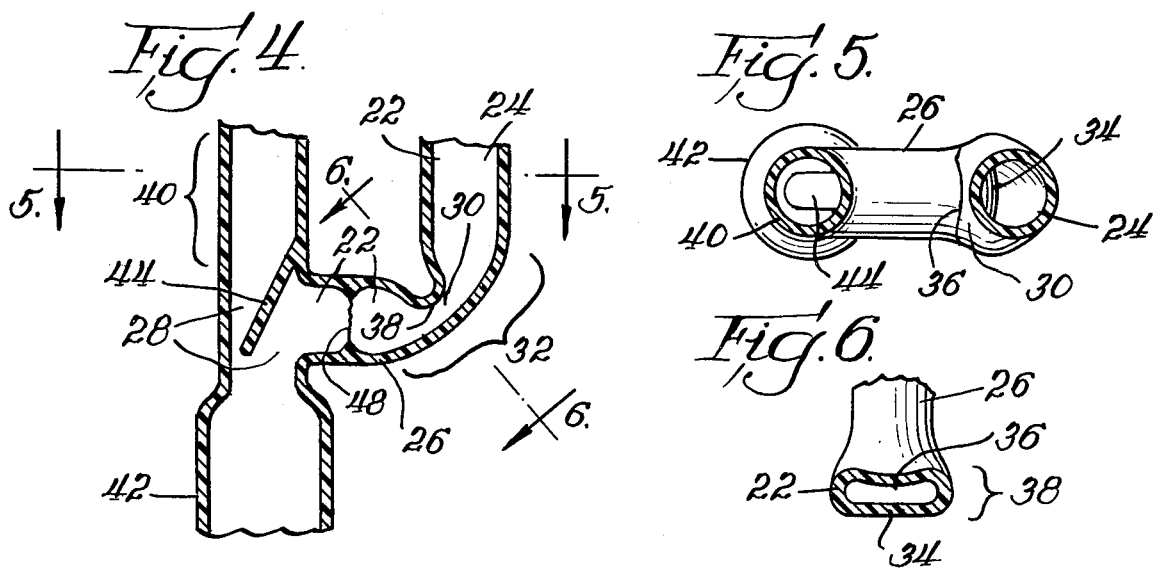

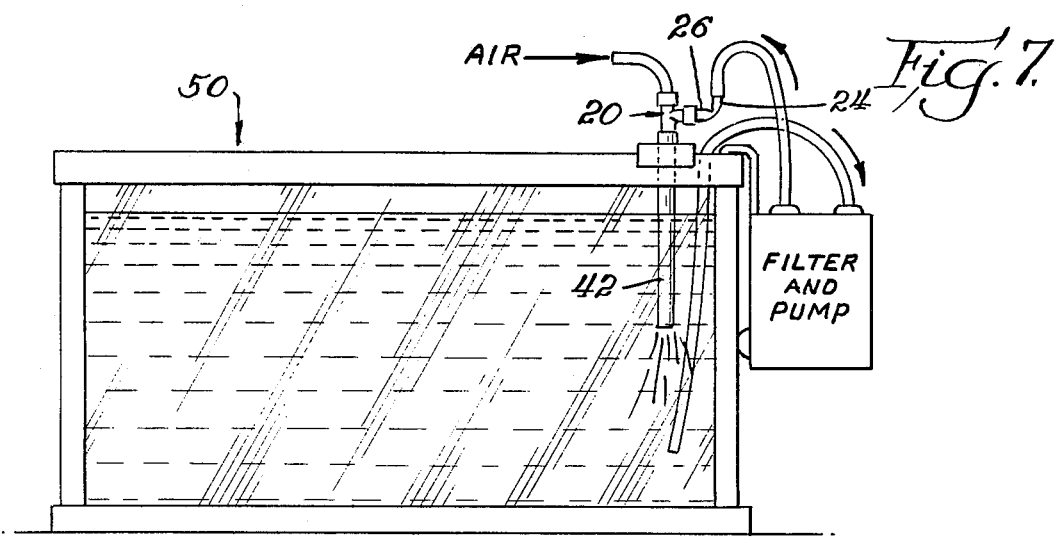
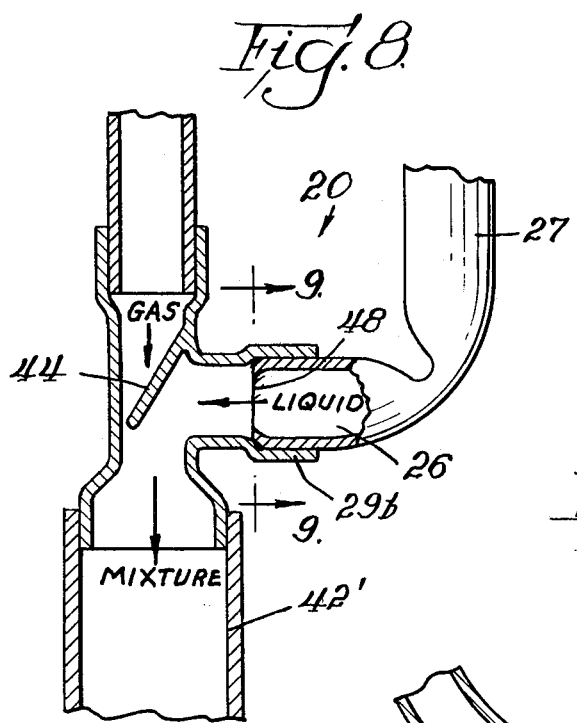
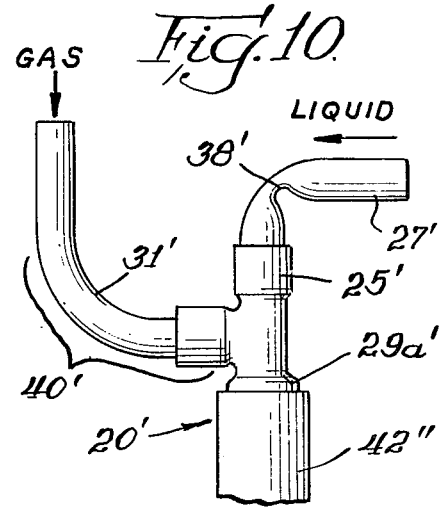
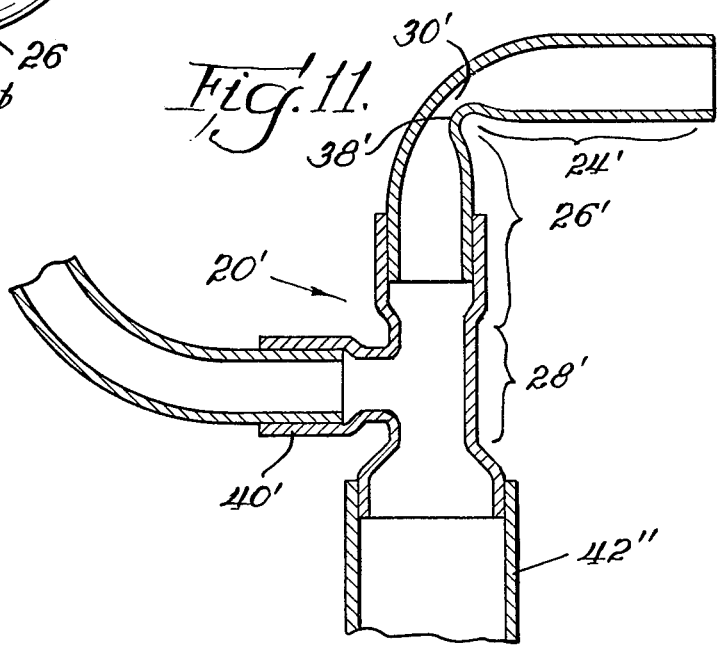
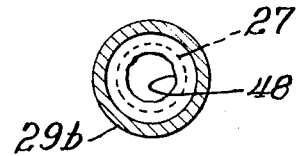

APPARATUS FOR THOROUGH MIXTURE OF A LIQUID WITH A GAS

BACKGROUND OF THE INVENTION

1. Field of the Invention

The present invention relates to a device for effectively intermixing a gas with a liquid. It is more particularly directed to an apparatus for aerating water both for sea life and for improved water quality. One embodiment of the invention is particularly useful at low liquid circulation pressures where a separate pump having the sole function of aeration was previously needed in addition to a circulation and filtration pump. This embodiment eliminates the need for the separate pump and is used with the circulation and filtration pump. The invention utilizes the venturi principle through a unique construction.

2. Description of the Prior Art

Many home aquariums employ "bubble type" systems using a pump which circulates water through a filter. In the process, air enters the line and bubbles of air pass through the water, thereby providing a certain low level aeration. More advanced aquarium systems employ two pumps, one for water circulation and filtration, and the other for water aeration. Such an improved circulation pump is illustrated by the Dyna-Flow brand pump in which a filter and circulation pump combination are attached to the side of the aquarium. Water is pumped out the aquarium into the Dyna-Flow attachment, through a filter therein, and is then circulated into the aquarium. Ordinarily a second, separate pump is then used to better provide water aeration needed for sustaining sea life and to increase the maximum possible fish population density. Until now, an efficient aerating device which may be attached to the single filtration/circulation pump system and provides adequate aeration has been unknown.

It is known to mix air or other gases with liquids by employing a venturi. Examples of such systems are U.S. Pat. Nos. 1,526,179, 2,388,753, and 3,756,220. Such systems use a venturi for aeration to improve water quality for animal life, to add oxygen for sanitizing and to purify water. Venturis are also used to agitate liquids, shown in U.S. Pat. No. 1,526,179 and in U.S. Pat. No. 3,587,976 as part of a hydrotherapy assembly.

A venturi construction different from the above, due to the location of the air intake in relation to the liquid out-flow, is shown in U.S. Pat. No. 3,146,195.

All the devices disclosed in the above named patents employ the basic concept behind a venturi valve, i.e., a decrease in flow cross section increases liquid velocity and thereby decreases pressure such that gas at the venturi is literally sucked into the passing liquid and mixed therein.

It has however been heretofore unknown to provide a low cost apparatus of simple construction having excellent efficiency not limited to agitation but also including the dissolving of a gas within a liquid, such as the aeration of water; such efficient liquid/gas intermixture being especially difficult at low liquid circulation pressures.

SUMMARY OF THE INVENTION

The present invention is intended to provide efficient liquid/gas intermixture over a broad range of liquid pressures and has many applications. The present invention employs a novel and improved venturi construction which is more efficient than prior aeration devices and is also less expensive to manufacture. In one embodiment, the device has been tested at pressures up to the maximum provided by most home water outlets and in this range the efficiency increases with pressure all the way to the maximum pressure obtained. It is believed that efficiency would be further improved with still greater liquid pressure. This embodiment of the device has excellent applications for purifying standing bodies of water such as are found on golf courses, for sewage treatment and septic tank treatment and also for large commercial fish hatcheries or so called "fish farms". Water aeration provides an improved environment for animal life both by providing the necessary oxygen and by making a major contribution to water purification.

Another embodiment of the invention provides excellent intermixing and dissolving efficiency at lower pressures such as used in home aquariums and so called "basement" and farm aquaculture. In this lower liquid pressure range this second embodiment provides efficiency superior to any previously known devices.

The present invention may simply be attached at the outlet of the water circulation/filtration pump to provide excellent aeration as well as circulation and filtration, thereby eliminating the second pump previously needed for proper aeration.

Other advantages of the present invention include the absence of any moving parts in either the "higher pressure" or "lower pressure" embodiments and thus should have extremely long operating life. The apparatus of the invention may be easily applied to many other systems now currently in use without extensive modification as the apparatus may simply be attached to the outflow line of a liquid circulation system. The apparatus does not hinder any existing filtration process and thus can be employed in the same liquid line in which filtration occurs. In fact, when employed with a water filtrating-/pumping system, the apparatus actually decreases needed pumping energy and increases filtration efficiency. By increasing aeration, the water cleaning process is aided, decreasing the water filtration needed to maintain a given level of water purity and thus reducing the rate at which water must be pumped through the filter.

The present invention is not limited to aeration of water by the atmosphere but includes the mixture of virtually any liquid with any gas. The apparatus employs a unique restriction structure in combination with a turn or bend in the liquid intake conduit. Liquid exiting the restriction has increased velocity and draws in gas from an adjacent source. In this respect the apparatus operates like previously known venturis. The liquid and gas are thoroughly mixed both at the gas source and as the liquid/gas mixture is expelled through the gas and liquid discharge conduit.

The lower pressure embodiment is provided with a ring inside the discharge portion of the liquid intake conduit, the ring having a rough surface which further increases liquid/gas intermixture at lower pressures. Efficiency is further enhanced by a liquid break piece in the mixing chamber of the apparatus to further increase liquid/gas surface contact. The apparatus works even at extremely low liquid circulation pressures at which such effective operation has previously been unknown.

BRIEF DESCRIPTION OF THE DRAWINGS

FIG. 1 is a side elevational view of the "lower pressure" embodiment of the invention as constructed.

FIG. 2 is a side elevational view of the apparatus as in FIG. 1, as made out of molded plastic.

FIG. 3 is a side elevational view of the apparatus as in FIG. 1, with a wider gas and liquid discharge conduit, rigidly and permanently attached to the mixing chamber.

FIG. 4 is a fragmentary cross section of the apparatus as in FIG. 2.

FIG. 5 is a top sectional view of the apparatus taken at line 5—5 of FIG. 4.

FIG. 6 is a sectional view of the junction taken at line 6—6 of FIG. 4.

FIG. 7 is a side elevational view of the "lower pressure" embodiment of the invention attached to a pump, and used in an aquarium.

FIG. 8 is a fragmentary, partial cross section of the apparatus as in FIG. 3.

FIG. 9 is a sectional view taken at line 9—9 of FIG. 8.

FIG. 10 is a side elevational view of the "higher pressure" embodiment of the invention.

FIG. 11 is a fragmentary cross section of the apparatus as in FIG. 10.

DETAILED DESCRIPTION OF THE PREFERRED EMBODIMENTS

FIGS. 1, 2, and 3 all illustrate the apparatus 20 and show different forms of construction, but each maintains the same internal structure for purposes of the invention. The illustrated apparatus is for use with systems utilizing lower liquid pressure pumping, such as home aquariums. As best shown in FIG. 2, liquid under pressure enters the liquid intake conduit 22 at intake portion 24. The apparatus is open to the gas to be mixed with the liquid through gas intake conduit 40. When used with home aquariums, the apparatus draws in air at atmospheric pressure. Liquid under pressure flows from intake portion 24 through a restriction 30 in the liquid intake conduit 22 and into the discharge portion 26 of the liquid intake conduit. Because of the restriction structure and other means explained below, liquid exits the discharge portion 26 in a rough stream. Due to a venturi-like effect, gas from the gas intake conduit 40 is drawn into this rough liquid stream such that the gas and liquid are violently intermixed in the mixing chamber 28. The liquid and gas mixture exits the mixing chamber 28 into the gas and liquid discharge conduit 42. The cross-sectional area inside this conduit 42 is greater than the cross-sectional area measured at any point along the discharge portion 26 and mixing chamnber 28. Thus the liquid and gas exit the mixing chamber 28 in a turbulent stream and the mixture is further intermixed as it expands into the greater, cross-sectional area of the gas and liquid discharge conduit 42.

Because liquid exits the discharge portion 26 in a rough stream and because there is a violent intermixture between the liquid and the gas, there is a much greater surface area of liquid exposed to the gas as compared to unagitated moving liquid exposed to a gas. Because of this greater surface area contact a high percentage of gas is actually dissolved into the liquid, especially considering the low pumping pressure of the liquid. In an aquarium system with water and air this produces a high level of aeration for water purification, eliminating entirely the need for a second, separate aerating pump in circumstances when the second pump would normally be used.

FIG. 1 illustrates the apparatus as originally constructed, having a rubber connector 23 holding the gas and liquid discharge conduit 42 to the sleeve 29a of metal "T-joint" 25. Insert 27 is placed inside another sleeve 29b of the "T-joint" and forms intake and discharge portions 24, 26 and restriction 30. Gas may enter the apparatus through the third sleeve 29c of the "T-joint", the third sleeve 29c along with gas intake conduit extension 31 serving as the gas intake conduit 40.

Although shown with intake portion 24 above restriction 30 and discharge portion 26, the metal insert 27 may be rotated so that intake portion 24 is below the restriction 30 and discharge portion 26, thus facilitating a short connection of intake portion 24 to a pump located below discharge portion 26.

By way of example only and not by way of limitation, the intake and discharge portions 24, 26 may be constructed of a metal tubing insert 27 having an inside diameter of 6/32 inch and an outside diameter of 8/32 inch. The restriction 30 may be made in this metal tubing. It may be attached to "T-joint" 25 which includes gas intake conduit 40 and mixing chamber 28 and has an inside diameter at the sleeves 29 a, b and c of 8/32 inch and an outside diameter of 10/32 inch. Gas intake conduit extension 31 is not needed for operation but merely serves to separate further the gas opening from the liquid being intermixed with gas. That portion of the "T-joint" not comprising the sleeve portions has an internal diameter of approximately 6/32 of an inch. The gas and liquid discharge conduit 42 has an inside diameter of about 10/32 of an inch and is approximately 5½ inches in length. While not critical on the higher pressure embodiment 20' of the invention, (FIGS. 10 and 11), the exhaust discharge conduit 42 on the lower pressure embodiment will cause efficiency to decrease if its cross-sectional area is too much greater than the cross-sectional area of the discharge portion and the mixing chamber. Thus, this is a factor to be considered in construction.

FIG. 2 illustrates the apparatus as constructed of molded plastic. FIG. 3 illustrates the apparatus using a metal "T-joint" 25 as in FIG. 1 except that the discharge conduit 42' is slightly enlarged, eliminating the need for rubber connector 23. It is believed that all three of the "lower pressure" constructions operate in identical fashion, although there remains the possibility that rubber connector 23 permits vibration which aids the intermixture of gas and liquid.

Both the lower and higher pressure embodiments have been constructed and are illustrated with a liquid intake conduit 22, mixing chamber 28 and discharge conduit 42 of circular cross section. While this may not be necessary to proper operation such construction is efficient.

It is the internal structure of the liquid intake conduit 22 and mixing chamber 28, and discharge conduit 42 and the relationship of the parts of the apparatus which produce an efficient intermixing apparatus even at extremely low liquid supply pressures. As best shown in FIGS. 2 and 4, a restriction 30 is formed in the liquid intake conduit 22 between and defining the intake and discharge portions 24, 26 thereof. An intermediate bend portion 32 is made in the liquid intake conduit such that the intake and discharge portions 24, 26 are substantially perpendicular. The bend portion 32 has a backside 34 around the outside of the bend portion 32 which is substantially flat and merges into both the intake and discharge portions of the liquid intake conduit 22. Opposite the backside 34 is a crimp-like bend 36 which defines the junction 38 of the intake and discharge portions. Together, the bend portion 32, flat backside 34 and crimp-like bend 36 form the unique restriction 30 used in the invention.

The interior shape of the liquid intake conduit 22 at the junction 38 is shown in FIG. 6, including the crimp-like bend 36. The inside cross-sectional area of the conduit 22 and mixing chamber 28 is at a minimum at the junction 38 defined by the crimp-like bend 36. From my research I have found that the shape of the liquid intake conduit through the restriction 30, and particularly at the junction 38 where the restriction is greatest, is of importance in the improved efficiency of my invention. This form of restriction 30 appears to work best when made in a substantially 90° turn in the liquid intake conduit for unknown reasons. In the preferred embodiments of the invention the restriction is such that the inside perimeter of the liquid intake conduit line at the junction 38 is less than or equal to the inside perimeter at any other point along the length of the conduit 22 or mixing chamber 28. Also, the maximum cross-sectional distance extending across the junction is greater than the maximum cross-sectional distance at any other point along the discharge portion 26 and mixing chamber 28. It should be noted that a standard 90° reducer pipe does not begin to approach the efficiency of the restriction 30 employed in the present apparatus 20, 20' and a device made with such a reducer is virtually inoperable for aeration when employed with a system having a low pressure liquid supply for which the apparatus 20 may be used.

I have found that the efficiency of liquid/gas intermixture is greatly enhanced when the above described restriction is combined with a rough burr-like edge 48 or ring positioned around the inside perimeter of the liquid intake conduit in the discharge portion 26 (FIGS. 4, 8 and 9). As constructed during research, the metal insert 27 was cut with a tube cutter which left a rough edge on the insert 27 (FIG. 8). In an attempt to make a more "finished" version of the apparatus, this rough edge was filed down. It was then found however that the apparatus 20 did not perform nearly as well. This rough burr-like edge 48 is shown on the metal insert 27 in FIGS. 8 and 9. FIG. 9 illustrates the rough edge 48 as seen looking down the liquid intake conduit 22 toward the restriction 30.

The circular burr-like edge may of course be placed within the discharge portion by other means than as explained above. The burr-like edge is also seen in FIG. 4 where the liquid intake conduit and mixing chamber 28 are constructed of one piece and the burr-like edge 48 is molded with the discharge portion 26.

The discharge portion 26 ends at the junction of the liquid intake conduit 22 with the gas intake conduit 40. I have discovered that the length of the discharge portion 26 is of importance in the efficient operation of the apparatus. In the apparatus I have constructed the operation was enhanced when the discharge portion was made shorter. It is believed that in the preferred embodiments of the invention, the discharge portion 26 should be as short as possible while still including the rough burr-like edge 48 in the lower pressure embodiment and not disrupting the structure of the restriction 30, including junction 38.

As shown in FIGS. 4, 5 and 8, also included in this "lower pressure" embodiment of the invention is a liquid break piece 44 comprising a stick-like projection which extends across the mixing chamber 28, serving to prevent what is commonly known as a "water lock" and ensuring that gas entering the mixing chamber 28 through the gas intake conduit 40 will be intermixed with the liquid entering the mixing chamber 28 from the discharge portion 26. As constructed, the liquid break piece 44 is secured to that portion of the gas intake conduit 40 adjacent the discharge portion 26. The placement of the liquid break piece 44 is not crucial, so long as it breaks up the liquid stream emanating from discharge portion 26.

It is believed that the violent liquid/gas intermixture occurs not only in the mixing chamber 28 but also at the entrance to and the beginning of gas and liquid discharge conduit 42, which has a cross-sectional area greater than at any point along the discharge portion 26 or mixing chamber 28. The discharge conduit 42 should be long enough to provide proper gas/liquid intermixture in the subject body of liquid. As seen in FIG. 7, the mixture exits the apparatus 20 far enough into the water of an aquarium 50 so as to ensure efficient aeration and avoid a mere surface effect.

Also as seen in FIG. 7, the aparatus 20 is in close proximity to the pump. Because of the low pressure under which the liquid is pumped, the distance between the pump and the lower pressure apparatus 20' is significant. Thus, this distance should be kept at a minimum.

A second embodiment of my invention provides excellent liquid/gas mixture at higher pressures than the above described embodiment and is shown in the apparatus 20' of FIGS. 10 and 11. Although it may be used in systems with liquid pressure almost as low as that provided in most home aquarium units, this second, "higher pressure" embodiment of the invention becomes more efficient as liquid pressure is increased, such efficiency increasing at least up to the maximum water pressure provided from a typical residential water faucet. It is believed that the unit's efficiency increases even more past this point. This embodiment of the invention could be useful for such applications as large aquariums, commercial fish farms or hatcheries and standing bodies of water such as are found on golf courses.

Whereas in the lower pressure embodiment the dischrage portion 26 and mixing chamber 28 are substantially perpendicular, here discharge portion 26' and mixing chamber 28' are parallel and substantially coaxial. The discharge portion 26' is still defined as the length of the liquid intake conduit 22' between the junction 38' and the intersection of the intake conduit 22' with the gas intake conduit 40'. The intake portion 24' remains substantially perpendicular to discharge portion 26'. If constructed using the metal "T-joint" the higher pressure embodiment may be employed by exchanging positions of the metal insert 27' and gas intake conduit extension 31'. A modified "T-joint" 25' may be used having enlarged sleeve 29a'.

In the higher pressure embodiment the liquid break piece 44 is not needed. Also, in this embodiment the rough burr-like edge 48 has been found to hinder rather than aid liquid/gas mixture so that the inside of the discharge portion 26' is relatively smooth.

The structure of the restriction 30' remains the same for the higher pressure embodiment, shown in apparatus 20', and a short discharge portion 26' remains a factor. Also, it still is important to have a gas and liquid discharge conduit with a cross-sectional area greater than that at any point along the discharge portion and mixing chamber. For the higher pressure embodiment a still larger gas and liquid discharge conduit 42" improves efficiency. In my research I have found that increasing the inside diameter of the discharge conduit 42" at least up to 14/32 inch further improves operation, assuming the other measurements of the higher pressure apparatus are similar to those mentioned above for the lower pressure apparatus.

Unlike the lower pressure apparatus 20, which is designed for use at liquid pressures lower than that at which liquid would "back-up" through gas intake conduit 40, the higher pressure apparatus 20' has no such consideration and the apparatus 20' may be operated in an inverted position if desired, with a longer gas intake conduit extension 31' so as to allow gas to still be drawn in, with the discharge conduit 42" located above the restriction 30'.

As stated above the absolute size of the entire apparatus (except possibly for the restriction), is not critical and it is believed that larger sizes may be made to operate well especially under higher pressures, thereby increasing the volume of liquid handled. What is important for both embodiments and particularly that of the lower pressure aparatus 20 is the relative sizes of the component parts. In addition, two or more of the higher pressure apparatus may be connected in parallel to the same liquid pumping source and will operate effectively.

While certain features and embodiments of the invention have been described in detail herein, it should be understood alternatives and modifications may be employed without departing from the scope and spirit of the invention as defined by the appended claims.

What is claimed is:

1. An apparatus for intermixture of a liquid and a gas, comprising:
   (a) a liquid intake conduit having an intake portion, a discharge portion and an intermediate bend portion formed such that the intake and discharge portions are substantially normal to one another, said liquid intake conduit intermediate bend portion having a restriction therein;
   (b) a mixing chamber adjacent to and downstream of said discharge portion;
   (c) a gas intake conduit connected to said discharge portion, whereby the liquid from said liquid intake conduit and the gas from said gas intake conduit are thoroughly mixed in said mixing chamber; and
   (d) a gas and liquid discharge conduit attached to said mixing chamber downstream of said mixing chamber, sad gas and liquid discharge conduit having an interior cross-sectional area greater than any cross-sectional area along the mixing chamber.

2. An apparatus for intermixture of a liquid and gas comprising:
   (a) a liquid intake conduit having an intake portion, a discharge portion and an intermediate bend portion formed such that the intake and discharge portions are substantially normal to one another, said intermediate bend portion having a restriction formed by a substantially flat interior backside around the intermediate bend portion merging into both the intake and discharge portions of said liquid intake conduit, and a crimp-like bend opposite the backside defining a junction of the intake and discharge portions of said liquid intake conduit;
   (b) a mixing chamber adjacent to and downstream of said discharge portion;
   (c) a gas intake conduit connected to said discharge portion, whereby the liquid from said liquid intake conduit and the gas from said gas intake conduit are thoroghly mixed in said mixing chamber; and
   (d) a gas and liquid discharge conduit attached to said mixing chamber downstream of said mixing chamber, said gas and liquid discharge conduit having an interior cross-sectional area greater than any cross-sectional area along the mixing chamber.

3. The apparatus of claims 1, or 2, wherein the discharge portion and mixing chamber are substantially normal and wherein said mixing chamber and gas and liquid discharge conduit are positioned lower than the gas intake conduit at its connection with the discharge postion when the apparatus is in operation, the apparatus including a rough, burr-like edge around the inside perimeter of the discharge portion.

4. The apparatus of claim 3, wherein said gas intake conduit is connected to said liquid intake conduit adjacent said discharge portion and at the beginning of said mixing chamber.

5. The apparatus of claim 4, including a liquid break piece extending across the mixing chamber where the gas intake conduit and liquid intake conduit intersect, such that liquid exiting the discharge portion is disrupted by said liquid break piece before being diverted into said gas and liquid discharge conduit.

6. The apparatus as in claim 5, wherein the intake portion, discharge portion and mixing chamber are substantially circular cross section.

7. The apparatus of claims 1 or 2, wherein said gas intake conduit is connected to said liquid intake conduit adjacent said discharge portion and at the beginning of said mixing chamber.

8. The apparatus of claim 7, wherein said discharge portion and mixing chamber are substantially parallel and coaxial.

9. The apparatus as in claim 8, wherein the intake portion, discharge portion and mixing chamber are of substantially circular cross section.

10. The apparatus as in claim 2, such that the inside perimeter of said liquid intake conduit at said junction is less than or equal to the inside perimeter at any other point along the length of the intake portion, discharge portion and mixing chamber.

11. The apparatus of claim 2, such that the inside perimeter of said liquid intake conduit at said junction is less than or equal to the inside perimeter at any other point along the length of the intake portion, discharge portion and mixing chamber, and such that the maximum cross-sectional distance at said junction is greater than the maximum cross-sectional distance at any other point along said discharge portion and mixing chamber.

12. An apparatus for intermixture of a liquid and a gas, comprising:
   (a) a liquid intake conduit having an intake portion, a discharge portion and an intermediate bend portion formed such that the intake and discharge portions are substantially normal to one another;
   (b) a restriction in said liquid intake conduit such that the intermediate bend portion extends through said restriction;
   (c) a mixing chamber adjacent to and downstream of said discharge portion;

(d) said intermediate bend portion and said restriction together including,
  i. a substantially flat backside around the intermediate bend portion and merging into both the intake and discharge portions of said liquid intake conduit, and
  ii. a crimp-like bend opposite the backside and defining a junction of the intake and discharge portions;
(e) a gas intake conduit intersecting said liquid intake conduit adjacent said discharge portion and at the beginning of said mixing chamber, such that the discharge portion is as short as possible and such that the gas from said gas intake conduit and the liquid from said liquid intake conduit meet and are thoroughly mixed in said mixing chamber; and
(f) a gas and liquid discharge conduit attached to and downstream of said mixing chamber, said gas and liquid discharge conduit having an interior cross-sectional area greater than any cross-sectional area along the discharge portion and mixing chamber.

13. The apparatus of claim 12, wherein said discharge portion and mixing chamber are substantially normal and wherein said mixing chamber and gas and liquid discharge conduit are positioned lower than the gas intake conduit at its intersection with the liquid intake conduit when the apparatus is in operation, the apparatus including a rough, burr-like edge around the inside perimeter of the discharge portion.

14. The apparatus of claim 13, including a liquid break piece extending across the mixing chamber where the gas intake conduit and liquid intake conduit intersect, such that the liquid exiting the discharge portion is disrupted by said liquid break piece before being diverted into said gas and liquid discharge conduit.

15. The apparatus of claim 14, such that the inside perimeter of said liquid intake conduit at said junction is less than or equal to the inside perimeter at any other point along the length of the intake portion, discharge portion and mixing chamber, and such that the maximum cross-sectional distance at said junction is greater than the maximum cross-sectional distance at any other point along said discharge portion and mixing chamber.

16. The apparatus of claim 12, wherein said discharge portion and mixing chamber are substantially parallel and coaxial.

17. The apparatus of claim 15, wherein the intake portion, discharge portion and mixing chamber are of substantially circular cross section.

18. The apparatus of claim 16, wherein the intake portion, discharge portion and mixing chamber are of substantially circular cross section.

* * * * *